(12) United States Patent
De Freitas et al.

(10) Patent No.: US 10,221,926 B2
(45) Date of Patent: Mar. 5, 2019

(54) CONTINUOUSLY VARIABLE TOROIDAL TRANSMISSION

(71) Applicant: ALLISON TRANSMISSION, INC., Indianapolis, IN (US)

(72) Inventors: Andrew De Freitas, Wigan (GB); Brian Dutson, Manchester (GB)

(73) Assignee: ALLISON TRANSMISSION, INC., Indianapolis, IN (US)

( * ) Notice: Subject to any disclaimer, the term of this patent is extended or adjusted under 35 U.S.C. 154(b) by 783 days.

(21) Appl. No.: 14/371,570

(22) PCT Filed: Jan. 10, 2013

(86) PCT No.: PCT/EP2013/050425
§ 371 (c)(1),
(2) Date: Jul. 10, 2014

(87) PCT Pub. No.: WO2013/104727
PCT Pub. Date: Jul. 18, 2013

(65) Prior Publication Data
US 2014/0378272 A1    Dec. 25, 2014

(30) Foreign Application Priority Data
Jan. 10, 2012 (GB) .................................. 1200357.0

(51) Int. Cl.
*F16H 15/38* (2006.01)
*F16H 15/40* (2006.01)
*F16H 15/08* (2006.01)

(52) U.S. Cl.
CPC ............. *F16H 15/40* (2013.01); *F16H 15/08* (2013.01); *F16H 15/38* (2013.01); *F16H 2015/383* (2013.01); *F16H 2200/00* (2013.01)

(58) Field of Classification Search
CPC .......... F16H 15/08; F16H 15/38; F16H 15/40; F16H 2015/383
(Continued)

(56) References Cited

U.S. PATENT DOCUMENTS 2,123,006 A * 7/1938 Hayes ..................... F16H 15/38
192/69.8
2,125,999 A * 8/1938 Erban ..................... F16H 15/38
476/40

(Continued)

FOREIGN PATENT DOCUMENTS

CN 101160479 A 4/2008
CN 101589247 A 11/2009
(Continued)

OTHER PUBLICATIONS

State Intellectual Property Office of the People's Republic of China Office Action for Application No. 201380013490.2 dated Apr. 15, 2016.
(Continued)

*Primary Examiner* — William C Joyce

(57) ABSTRACT

In a toroidal variator a plurality of rolling elements (20, 22) are in driving engagement with an input and output race (10, 14) at respective contact regions. Each rolling element (20, 22) is mounted on a carriage assembly (26) for rotation about a rolling axis, and is being free to pivot about a tilt axis, the tilt axis passing through the rolling element (20, 22) perpendicular to the rolling axis, and intersecting the rolling axis at a roller center, whereby a change in the tilt axis causes a change in the variator ratio being the ratio of rotational speeds of the races. The tilt axis is arranged at an angle known as castor angle (see FIG. 4) to a plane (P) perpendicular to the variator axis (V). Each carriage assembly (26) can cause a movement of the rolling element (20, 22) with a component of rotation about a pitch axis (A, B).

(Continued)

The pitch axis is defined as passing through the roller center and through the contact regions. Pitching the roller elements (20, 22) causes them to tilt, thereby changing the transmission ratio.

29 Claims, 9 Drawing Sheets

(58) Field of Classification Search
USPC .................................. 476/40, 42, 43, 44, 46
See application file for complete search history.

(56) References Cited

U.S. PATENT DOCUMENTS

| | | |
|---|---|---|
| 7,217,220 B2 | 5/2007 | Careau et al. |
| 2008/0269001 A1 | 10/2008 | Greenwood et al. |
| 2008/0305920 A1 | 12/2008 | Nishii |
| 2010/0197448 A1 | 8/2010 | Hoffman |
| 2011/0300989 A1 | 12/2011 | Greenwood et al. |

FOREIGN PATENT DOCUMENTS

| | | |
|---|---|---|
| EP | 1316744 A2 | 6/2003 |
| EP | 1826460 A1 | 8/2007 |
| EP | 1846672 A | 10/2007 |
| EP | 2054643 A | 5/2009 |
| EP | 1846673 B1 | 6/2009 |
| GB | 410150 A | 5/1934 |
| GB | 665237 | 1/1952 |
| GB | 2360072 A | 9/2001 |
| JP | H09/324841 A | 12/1997 |
| JP | 2000/046145 A | 2/2000 |
| JP | 2003/307262 A | 10/2003 |
| JP | 4200728 B2 | 12/2008 |
| JP | 2009523987 A | 6/2009 |
| WO | 2006/084905 A1 | 8/2006 |
| WO | 2008/017881 A1 | 2/2008 |
| WO | 2008/038043 A2 | 4/2008 |
| WO | 2006/131778 A1 | 11/2008 |
| WO | 2011109889 A1 | 9/2011 |
| WO | 2011151615 A1 | 12/2011 |
| WO | 2013/104733 A1 | 7/2013 |
| WO | 2013/110920 A1 | 8/2013 |
| WO | 2013110670 A1 | 8/2013 |

OTHER PUBLICATIONS

Potentially related application, U.S. Appl. No. 14/373,963, filed Jul. 23, 2014, published as WO2013/110670 on Aug. 1, 2013.
Potentially related application, U.S. Appl. No. 14/373,970, filed Jul. 23, 2014, published as WO2013/110920 on Aug. 1, 2013.
UK Intellectual Property Office Search Report dated Jun. 25, 2013 for Application GB1300453.6.
UK Intellectual Property Office First Office Action dated Mar. 24, 2014 for Application No. GB 1300453.6.
UK Intellectual Property Office Combined Search & Examination Report dated Oct. 10, 2014 for Application No. GB1414886.0.
UK Intellectual Property Office Second Office Action dated Apr. 1, 2015 for Application No. GB1414886.0.
UK Intellectual Property Office First Office Action dated Oct. 20, 2014 for Application No. GB1414222.8.
UK Intellectual Property Office Second Office Action dated Feb. 24, 2015 for Application No. GB1414222.8.

* cited by examiner

CONTINUOUSLY VARIABLE TOROIDAL TRANSMISSION

BACKGROUND

This invention relates to variators. More specifically, it relates to variators that are components of a mechanical transmission system.

In this context, a variator is a transmission component that interconnects two rotatable elements whereby, when rotating, the two elements have rotational speeds related to one another by a ratio (referred to as the "variator ratio") that can vary between a minimum variator ratio and a maximum variator ratio in a substantially stepless manner.

Full Toroidal Variators

A range of variators are known as "full-toroidal" variators. In a full-toroidal variator, each rotatable element is connected to a respective race within the variator, such that each rotatable element is fixed for rotation with its race and such that the races rotate about a common axis (the "variator axis"). Each race has a working surface, arranged such that the working surfaces face one another in a direction parallel to the variator axis. An annular recess of arcuate cross-section is formed within each working surface, coaxial with the variator axis. The recesses are of substantially the same radius with respect to the variator axis (the "toroidal radius"), and are arranged such that their cross sections lie on a common hypothetical circle, the plane of which intersects the variator axis and the centre of which is in a plane (the "centre plane") parallel to and spaced equally between the working surfaces. By extending the hypothetical circle around the variator axis, a hypothetical torus is described, the working surfaces occupying opposite regions of the boundary of the torus. Therefore, the space between the working surfaces of the races is referred to as the "toroidal cavity".

Several rolling elements are provided within the toroidal cavity. Each rolling element has a rolling surface that makes contact with (subject to the discussion below) a respective working surface of the two races. Each rolling element is carried in a respective carriage such that it can rotate with respect to the carriage about a rolling axis upon which the rolling surface is centred.

Rotation of one of the races (called the "input race" in this discussion) with respect to the carriages causes each rolling element to rotate, and this, in turn causes a torque to be applied to the other race (called the "output race" in this discussion), in a direction opposite to the rotation of the input race. If the output race is allowed to rotate in response to the applied torque, it will do so in a direction opposite to that of the input race. During such rotation, each rolling element will make contact with the input race and the output race about a respective circular contact locus described on the respective working surfaces. If these two loci are of the same radius (the radius of a locus being generally referred to as the "contact radius"), then output race and the input race will have the same rotational speeds (albeit in opposite directions). However, if the contact radius of on the input race (the "input radius") is not equal to the contact radius on the output race (the "output radius"), then the speed of the output race will be greater than or lesser than the speed of the input race. In general, the variator ratio will be equal to the ratio of the input radius to the output radius.

Each carriage is configured such that the rolling axis can be moved to alter the input and the output radii, this movement being referred to as "tilt". At least when the variator is operating in an equilibrium condition, the input and the output radii are symmetrically disposed about the toroidal radius.

The forgoing description refers to contact between the working surfaces and the rolling elements. However, this is a simplification. Most embodiments of toroidal variators operate using traction drive. That is to say, the working surfaces and rolling elements are at least partially immersed in a traction fluid. This has the property of having a viscosity that increases rapidly when its pressure exceeds a threshold. As the races rotate, traction fluid is drawn into the nips formed between the rolling elements and the working surfaces to create a thin layer of traction fluid between the rolling surfaces and the working surfaces, so there is, literally speaking, no contact between them. In order to achieve a satisfactory traction drive, an end load is applied, which urges the races towards one another along the variator axis. The end-load is optimised to balance the requirement of providing sufficient loading to produce adequate traction at the interfaces between the working surfaces and the rolling surfaces, but low enough not to compromise the efficiency and durability of the variator. In many embodiments, the races may make slight movements along the variator axis in response to the end-load.

Within the general arrangement of a full-toroidal variator described above, a great many variations are possible concerning control, mounting and freedom-of-movement of the carriages, number and configuration of races, number and configuration of rolling elements, and so on.

In one modification to the variator described above, each rolling element is replaced by a train of two rolling elements in contact with one another. Thus, each rolling element is in contact with one working surface and with the other rolling element. This arrangement has several advantages and several disadvantages as compared with the arrangement described above, but these will not be discussed here. It should be noted that in a variator that incorporated this modification, both races turn in the same direction about the variator axis.

The use of the terms "input" and "output" to define the races should not be taken as a functional or structural limitation relating to these components—they are simply labels. The variator may be entirely symmetrical in operation. These will typically be chosen to provide a concise and understandable description in a particular context. For example, in the case of transmission for a vehicle, the input will typically be connected to a prime mover, and the output will typically be connected to a final drive system to indicate the normal direction of power flowing through the variator. However, it will be understood that when the vehicle is in an overrun condition, engine braking will actually cause power to flow from the output to the input of the variator.

In the remainder of this specification, the term "variator" will refer to a full-toroidal variator as described above, unless the context indicates otherwise.

Variator Control

There are two main strategies used to control a variator: torque control and ratio control.

Torque control has no direct equivalent in multiple-speed transmissions because it relies upon a feature arising from the nature of a variator. Torque control has been described in many publications, including those parts of WO-A-2010/

070341 that relate to FIGS. 1 to 3, and will be described here only briefly, as required to enable the present invention to be understood.

Torque control relies upon the variator having several design features:
- each carriage has freedom to rotate about a reaction axis that is inclined by a small angle to the centre plane; and
- each carriage can move axially along the reaction axis against a force applied to it by an actuator.

Note that the first of these requirements means that while under torque control, tilt angle is not controlled directly by an actuator.

Each race applies a force to each rolling element that acts in a direction tangential to the working surface. Therefore, equal and opposite tangential forces must be provided by each actuator to maintain the rolling axis of the corresponding rolling element stationary along the reaction axis. If the force applied by the actuator changes, the forces acting on the carriage become imbalanced, so the rolling axes will move. The geometry of the variator is configured (using considerations that will not be discussed here) such that upon movement along the reaction axis, a couple is generated about the reaction axis that causes the carriage to rotate. This changes the tilt angle, and therefore the variator ratio, in such a way as to reduce the imbalance of forces acting on the carriage. The carriage will therefore move towards a new tilt angle at which the forces return to balance. Due to the geometry of the variator, the carriage assemblies move along their reaction axes and rotate about their tilt axes, such that they accommodate the ratio of the speeds of the input and the output races.

Ratio control bears the nearest similarity to the control of a transmission with multiple discrete, spaced ratios. In a ratio-control arrangement, the roller and carriage displacements are controlled by means which are not responsive to the reaction forces experienced by the roller carriages. The fundamental operating principle of ratio control is that a control system determines the variator ratio required to achieve a desired operating condition and operates actuators to move the carriages in such a way as to directly cause the rolling axes to tilt to the angle required to achieve the target ratio.

Aim of this Invention

If ratio control is attempted by directly changing the tilt of the carriages, without other movement, one side-effect is that the contact point between the rolling elements and the working surfaces is moved radially across the working surfaces. This can only be achieved by shearing the traction fluid in the region of the contact point which, it will be recalled, is highly viscous. Therefore, the level of power that must be supplied to actuators to achieve such direct control actuation is significant and may require costly actuation mechanisms to deliver the required force and stroke. An aim of the invention is to provide an arrangement which enables control of the rolling elements using low actuation power, and hence requiring low-cost actuators.

To this end, the present invention provides a variator (typically a full-toroidal variator) comprising: an input race and an output race each having a working surface, the races being coaxially mounted for rotation about a variator axis, and a toroidal cavity being defined between the working surfaces; a plurality of rolling elements disposed between and being in driving engagement through a traction fluid with the working surfaces at respective contact regions, each rolling element being mounted on a carriage assembly for rotation about a rolling axis, each carriage being free to pivot about a tilt axis, the tilt axis passing through the rolling element perpendicular to the rolling axis, and intersecting the rolling axis at a roller centre, whereby a change in the tilt angle causes a change in the variator ratio being the ratio of rotational speeds of the races; wherein each roller carriage assembly can cause pivotal movement, which pivotal movement results in a change of a pitch angle of the rolling element, the pitch angle being about a pitch axis that passes through the roller centre and passing through the contact regions; and the variator further comprising a control member operative to cause a respective roller carriage to undertake the said pivotal movement thereby changing the pitch angle, so urging the plurality of rolling elements to pivot about their tilt axes and thereby provide a change in variator ratio.

The arrangement by which the pitch axis passes through the contact regions ensures that rotation or a component of rotation about the pitch axis involves a rotational change relative to the disc at the contact point but does not involve a significant change in the contact radius. Thus, it does not of itself cause a substantial change in the variator ratio, and does not cause significant translational movement of the contact region across the working surface, thereby minimising the work that must be done in changing the pitch angle. This allows a change of variator ratio to be effected using a low actuation force, which requires an actuator of low power, and therefore low cost.

The effect of changing the pitch angle can be understood by considering the patch of contact between the rolling surface of the rolling element and the input or output working surface. A point on the working surface at the centre of the contact patch must necessarily be moving with a velocity tangential to the variator axis. If the pitch angle is 0, and the rolling elements are at a tilt angle of 0, corresponding to a variator ratio of −1.0, then a point on the rolling surface at the centre of the contact patch will also be moving with a velocity tangential to the variator axis. However, changing the pitch angle has the effect of rotating the velocity vector of the point on the rolling surface so that it gains a component directed towards or away from (depending on the direction of pitch) the variator axis. This, in turn, gives rise to a force acting on the rolling surface (normally generated by shear forces within the traction fluid) that urges a change of tilt of the rolling element, the change in tilt being in a direction that tends to reduce the pitch angle. Therefore, the rolling elements will tilt to asymptotically approach a new equilibrium tilt angle.

Each carriage assembly may be mounted for pivotal movement about an axis passing through the centre of the respective rolling element and may optionally be actuated at an actuation point radially distant from the axis such that the carriage sweeps through an arc centred on the actuation point. Each actuation point is preferably offset from the centre plane of the variator in a direction parallel to the variator axis, in which case, the offset typically determines a castor angle between each rolling element and the associated working surface.

Each carriage assembly may be constrained to the said pivotal movement by i) coupling with the control member about a an actuation point and ii) coupling about a second reaction point which acts on the centre of rotation of the rolling element or at a point between the said centre and the actuation point for bearing torque from the rolling elements.

Each rolling element and its respective carriage assembly may together have four points of contact, the points of contact being at the input surface, the output surface, an actuation point and a reaction point such that the rolling element is constrained in its position in the toroidal cavity but the rolling element is mounted for pitching movement about an axis perpendicular to the rotational axis of the rolling element and also perpendicular to the tilt axis and is free to steer to a position to provide a change in variator ratio. The control member may be adapted to provide actuation by translational movement.

The control member may actuate the carriage assembly at a location radially outward of a surface of a cylinder that is coaxial with the variator axis and tangential to the periphery of the larger of the input surface and output surface.

The respective carriage assemblies may each be actuated simultaneously. A variator may comprise an actuator for each respective carriage assembly. The variator may comprise a single control member on which the carriage assemblies are mounted. The control member typically comprises a fixed part and a movable part operatively coupled to the fixed part, the movable part being movable in a plane perpendicular to the variator axis. The fixed part of the control member may comprise a plurality of arcuate slots each slot corresponding with a respective carriage wherein the carriage assembly comprises an engagement part for sliding engagement of the carriage assembly along its respective slot such that the carriage is constrained to the said pivotal movement. In embodiments of the invention, each carriage assembly comprises a stem coupled to the control member.

Each carriage assembly is preferably mounted such that the rolling axis of the rolling element is inclined to a plane perpendicular to the variator axis whereby the rolling element is free to rotate about an axis defined between the centre of the rolling element and a pivotal joint that is radially disposed from the axis of the rolling element, the pivotal joint being axially offset from the centre plane of the toroidal cavity and located either on the control member or, where the variator comprises a reaction member, on the reaction member. The carriage assembly may comprise a longitudinally extending carriage stem and a roller carrier upon which the rolling element is rotatably mounted and which is rotatable about a longitudinal axis of the stem. Each rolling element may be mounted on its respective roller carrier by a pivoting joint passing through the centre of the rolling element such that the rolling element is free to rotate about its precession axis.

The control member may be movable radially of the variator axis and may optionally be movable in a non-radial direction such that that the control member balances reaction loads generated by each rolling element within the toroidal cavity. The control member may be operatively coupled to the plurality of rolling elements on the same side of a plane that passes through the variator axis.

In typical embodiments, the toroidal cavity contains two rolling elements.

Preferred embodiments of the invention comprise a reaction member operatively coupled to the plurality of rolling elements such that it bears the reaction torque from the rolling elements within the toroidal cavity. In such embodiments, reaction torque is typically wholly or partially borne by the reaction member separately from the control member. The reaction member may pivotally be coupled to the centre of each rolling element. The reaction member may be coupled to the rolling element such that the carriage assembly is constrained to the said pivotal movement. In a preferred arrangement, the reaction member is movable radially of the variator axis and optionally is movable in a non-radial direction such that that the reaction member balances reaction loads generated by each rolling element within the toroidal cavity. A variator may further include a damper to dampen movement of the reaction member in a radial direction relative to the variator axis. The reaction member may comprise a mechanical end-stop to limit movement of the reaction member in a radial direction relative to the variator axis. The reaction member may be mounted for rotation about the variator axis in response to reaction torque arising from the disc to rolling element contact thereby changing the variator ratio. For example, the reaction member may be mounted for rotation about the variator axis in response to a reaction torque above a pre-determined level. This may be achieved in a variator comprising resilient means against which the reaction member may be urged in response to a reaction torque.

Movement of each carriage about the pitch axis is preferably achieved by a single translational input. Such translational input may be substantially perpendicular to the carriage reaction force. This optionally allows the reaction force from the carriage to be borne effectively by the actuation member and also optionally enables the castor angle to be defined by an offset stem. Translational input may be achieved my means of an actuator, and preferably a single actuator for all roller carriages of the variator. A variator embodying the invention may comprise power means to actuate the control member having a power output of less than 20 W, more preferably less than 10 W, and yet more preferably less than 5 W.

In preferred embodiments of the invention, movement of the carriage about the pitch axis is caused by one or more components of the variator moving other than in rotation about the pitch axis. For example, such movement of the carriage about the pitch axis may be accompanied by rotational movement of components exclusively that are not coincident with the pitch axis.

Embodiments of the invention may be extended to provide variators having multiple toroidal chambers. For example, a variator embodying the invention may further comprise: a second input surface and a second output surface that faces the second input surface to define a second toroidal cavity; a second plurality of rolling elements disposed between the second input and second output surfaces and being in driving engagement with the surfaces, each rolling element being rotatably mounted on its respective carriage assembly and able to tilt about an axis passing through the centre of the rolling element in order to change the variator ratio and being mounted for pivotal movement resulting in the rolling element pitching about an axis passing through the centre of the rolling element and perpendicular to the rotational axis of the rolling element and also perpendicular to the ratio change axis; a control member for actuation of the each carriage assembly to pitch the respective rolling element resulting in precession and a change in variator ratio; and optionally a first reaction member operatively coupled to the plurality of rolling elements in the first cavity and a second reaction member operatively coupled to the second plurality of rolling elements in the second cavity such that the first and second reaction members bear reaction loads arising from the respective rolling elements; and a load-sharing assembly operatively linked to the reaction members of the first and second cavities such that reaction torque from the reaction members is balanced.

The variator of the present invention is particularly useful in providing drive to an auxiliary unit. Any known auxiliary units may be driven by a drive arrangement comprising the present variator but the variator is especially beneficial in a drive arrangement system for a supercharger. Suitably drive is transmitted from an internal combustion engine to a supercharger through a drive system that includes a continuously-variable transmission comprising a variator according to the invention. This supercharging arrangement has particular application to passenger cars and light road vehicles. Use of the variator in a supercharger drive arrangement allows cost, complexity and weight to be kept to a minimum.

The invention further provides a supercharging arrangement for an internal combustion engine comprising a supercharger having a rotational drive input a transmission having a rotational drive input to receive drive from an internal combustion engine, and a rotational drive output connected to the input of the supercharger wherein the transmission includes a variator according to this invention operatively connected between the input and the output of the transmission.

The variator suitably has an output that is driven at an operating ratio from an input and control means operative to set the operating ratio of the variator. In one embodiment, the variator has a single-cavity having two rollers.

Suitably the transmission includes an epicyclic gearset. Preferably the epicyclic gearset is a traction drive epicyclic gearset. In a preferred embodiment, the epicyclic gearset shares traction fluid with the variator.

The supercharger may be of any known type. Preferably the supercharger is a centrifugal supercharger.

BRIEF DESCRIPTION

Embodiments of the invention will now be described in detail with reference to the accompanying drawings in which.

DETAILED DESCRIPTION

Figure 1:
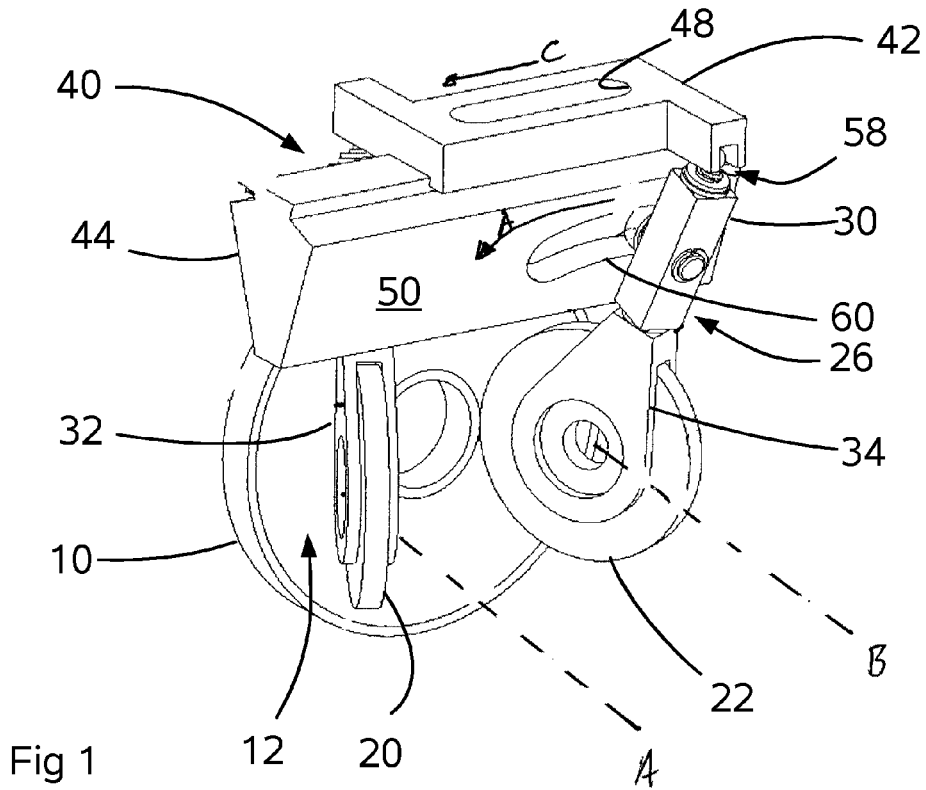
FIG. 1 is a perspective view of part of a variator being a first embodiment of the invention.
Figure 2:
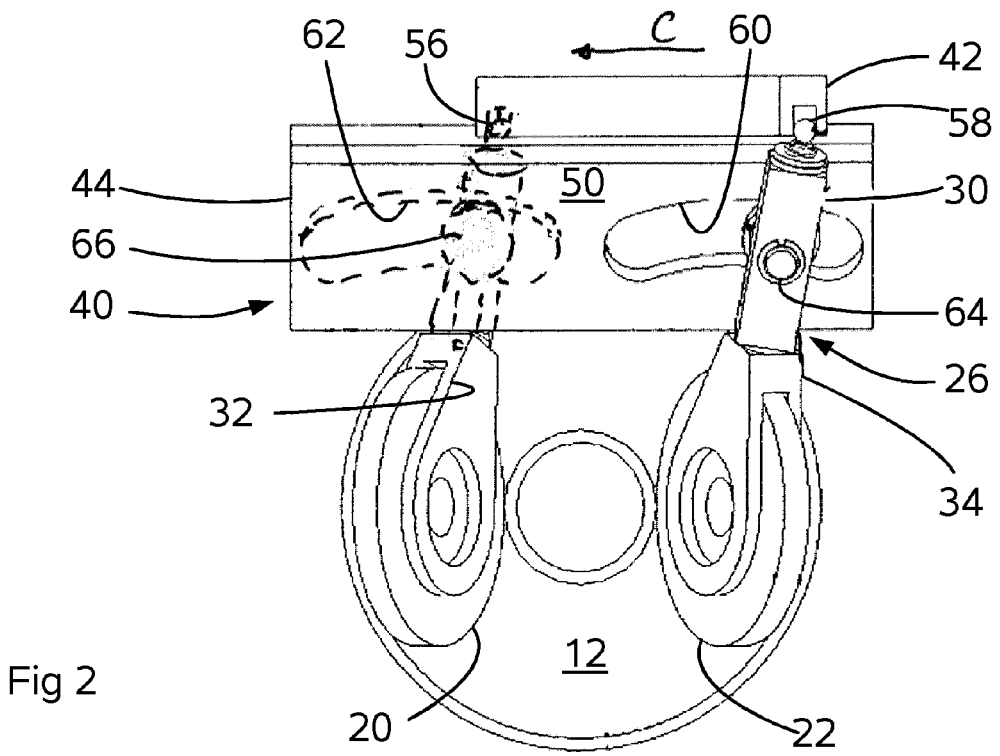
FIG. 2 is a control assembly of the part of the variator shown in FIG. 1.
Figure 3:
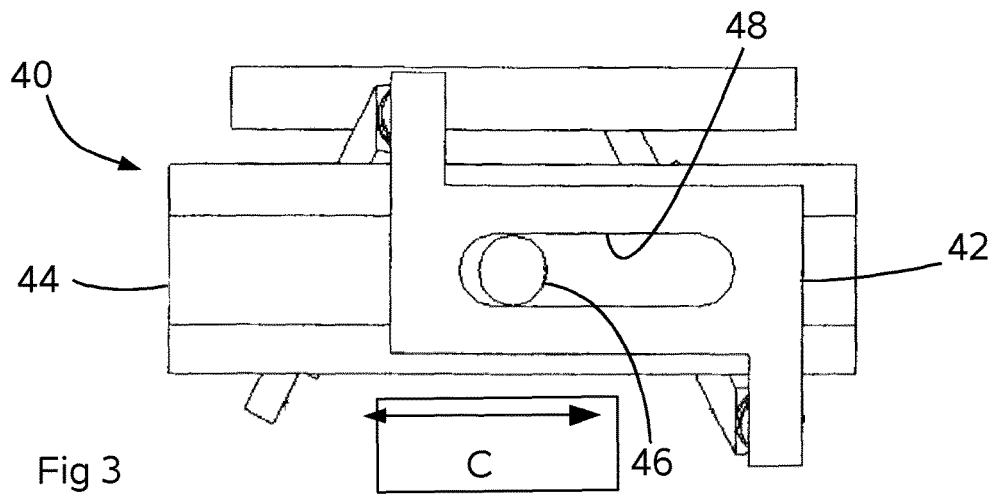
FIG. 3 is a top view of the part of the variator shown in FIG. 1.

When reading the description of the embodiments, suitable attention should be given to the terminology, explanations and definitions set forth in the introductory part of this specification.

FIGS. 1 to 4 show different views of a part of a variator embodying the invention. The variator comprises an input race 10, shaped generally as an annulus. The input race 10 has an inner surface within which annular recess 12 of arcuate cross-section is formed to provide a working surface of the input race 10. The variator further comprises an output race 14, shown in dotted lines only in FIG. 4 that is substantially similar to the input race 10. The input race 10 and the output race 14 are disposed coaxially on a variator axis V, with their working surfaces facing one another, thus forming a toroidal cavity between the races 10, 14 that is bounded by their working surfaces. Each of the races 10, 14 is mounted for rotation about the variator axis V.

Rolling elements, in this case in the form of approximately cylindrical rollers 20, 22 with suitably profiled outer rolling surfaces are disposed for operation within the toroidal cavity. In this embodiment, there are two such rollers, but it will be understood that a greater number could alternatively be provided.

Each roller 20, 22 is mounted on a respective roller carriage assembly 24, 26. Each roller carriage assembly 24, 26 includes a stem 28, 30 and a fork 32, 34. Each fork 32, 34 carries a respective roller 20, 22 such that the roller 20, 22 can rotate on a bearing for rotation about a rolling axis that extends through its centre. Within each roller assembly 24, 26, each fork 32, 34 can rotate on its stem 28, 30 about a respective tilt axis that is normal to its rolling axis.

Figure 4:
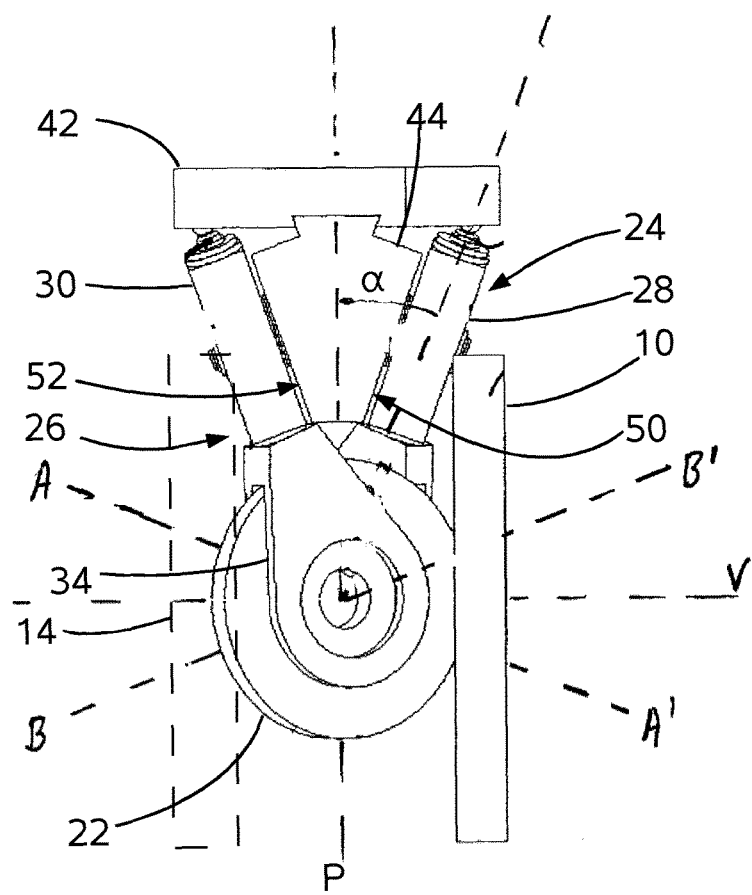
FIG. 4 is a side elevation of the part of the variator shown in FIG. 1.

Each carriage assembly 24, 26 is mounted such that the tilt axis of the stems 28, 30 is inclined to a plane P at an angle "α" known as the castor angle as shown in FIG. 4. The plane P is perpendicular to the variator axis. Each roller 20, 22 is free to pivot about the respective tilt axis, being the longitudinal axis of the stem 28, 30, which passes through the centre of the roller 20, 22—that is to say, the castor angle is the angle between the tilt axis and the centre plane of the variator.

The input race 10 is driven by and transmits drive to the output race 14 through the rollers 20, 22 which are in driving engagement between the races.

The variator includes a control assembly 40 which comprises a slider 42 carried on a support 44. The slider 42 is adapted for reciprocal linear movement relative to the fixed part 44. A peg 46 projects from the support 44 through a slot 48 in the slider 42 such that it acts as a stop to limit the range of movement of the slider 42 on the support. The control assembly 40 is adapted to provide I actuation of the variator by translational movement. The slider 42 is able to travel back and forth along the support 44 in a direction indicated by arrow C, along an axisin a plane perpendicular to the variator axis. In this embodiment, the slider 42 is connected to each roller carriage assembly 24, 26 at a location radially outward of a cylindrical plane which is parallel to the variator axis V and tangential to the periphery of the larger of the input race 10 and output race 14. In an alternative embodiment, the carriage assemblies 24, 26 may each be actuated by their own actuator. The support 44 has surfaces 50, 52 that are each inclined at the castor angle a to the centre plane of the variator perpendicular to the variator axis V.

The control assembly 40 is operatively coupled to the carriage assemblies 24, 26 by actuation joints 56, 58. The actuation joints 56, 58 constrain upper end parts of each stem 28, to move linearly with the slider 42 while allowing the stems 28, 30 to pivot with respect to the slider 42. The single control assembly 40 controls both carriage assemblies 24, 26 in unison. The carriage assemblies 24, 26 are also coupled to the control assembly 40 at respective reaction points. Each reaction point comprises an arcuate slot 60, 62 that extends into a respective reaction surface 50, 52 of the support 44. The stem 28, 30 of each of the carriage assemblies 24, 26 carries a projecting reaction pin 64, 66 that extends into a respective arcuate slot, in which it is a close sliding fit with sufficient to allow free sliding engagement of each reaction pin 64, 66 in its slot 60, 62. The stem may be equipped with rollers to provide smooth engagement and a rolling engagement with the slot.

(In an alternative embodiment, the arcuate slots may be arranged perpendicular to the stems 28, 30 with the stem passing through the slot and forming the engaging part which cooperates with the slot to locate the roller carriage.)

Each roller 20, 22 and its carriage assembly 24, 26 together have four points of contact with the variator; contact between the roller 20, 22 at the working surface of the input race, the working surface of the output race 14, with the control assembly 40 at the actuation joint 56, 58, and the reaction point through the reaction pin 64, 66 and its respective slot 60, 62. Each carriage assembly 24, 26 is located within the toroidal cavity by the two points of contact with the control assembly 40 and by the contact between the roller and the working surfaces of the input and output races. These points of contact mean that the carriage assemblies 24, 26 are mounted such that they are able to move to vary a pitch angle about a respective axis A-A', B-B' (being the axes about which arcuate slots 60, 62 are centered) to cause pivoting of the roller about the pitch axis. These axes A-A' and B-B' are perpendicular to the tilt axis of the carriage assembly. The carriage assembly 24, 26 is actuated through the actuation joint 56, 58, situated radially distant from the roller pitch axis. The roller carriages 24, 26 are constrained to the pivotal movement by the coupling of the reaction pins 64, 66 in their slots 60, 62. The arrangement allows reaction torque from the rollers 20, 22 to be borne.

The pivoting motion of the carriage assemblies that occurs as the slider 24 moves imparts to the rollers 20, 22 a component of rotation about their pitch axis. The pivoting motion also imparts a component of rotation about an axis perpendicular to the pitch axis, referred to as a ratio change axis. This rotation allows each roller 20, 22 to alter its tilt so as to change the speed ratio and may momentarily experience contact forces from the input and output surfaces. The mounting of the roller 20, 22 in a fork 32, 34 such that is may rotate about its tilt axis enables the roller 20, 22 to tilt so as to find a path of least resistance to reach equilibrium so as to change the variator ratio. In this way, through the combination of the pivotal movement of the carriage assembly and the freedom of rotation about the tilt axis, the roller is free to undergo a tilting motion to provide a change in variator speed ratio. The rollers 20, 22 are therefore able to steer (that is, to vary their tilt) in response to actuation by pivoting about their respective pitch axis and alter their position to change the speed ratio of the variator.

In another embodiment, each carriage assembly comprises a stem alone with the rollers being mounted on the end of the stem through a gimbal. In this arrangement each roller 20, 22 is mounted on its respective carriage assembly by a pivoting joint passing through the roller centre such that the roller is free to tilt about its tilt axis. The stem suitably lies in the centre plane P of the variator and the gimbal arrangement provides the castor angle and degrees of freedom for the roller 20, 22 to freely tilt.

Figure 5:
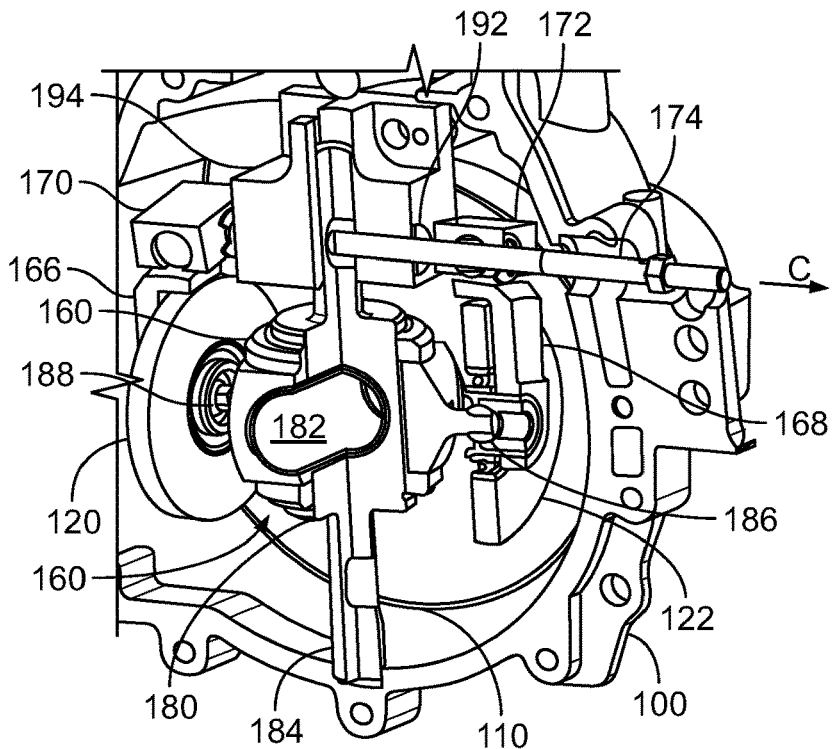
FIGS. 5 and 6 are perspective and part cut-away views of part of a variator being a second embodiment of the invention including a reaction member.
Figure 6:
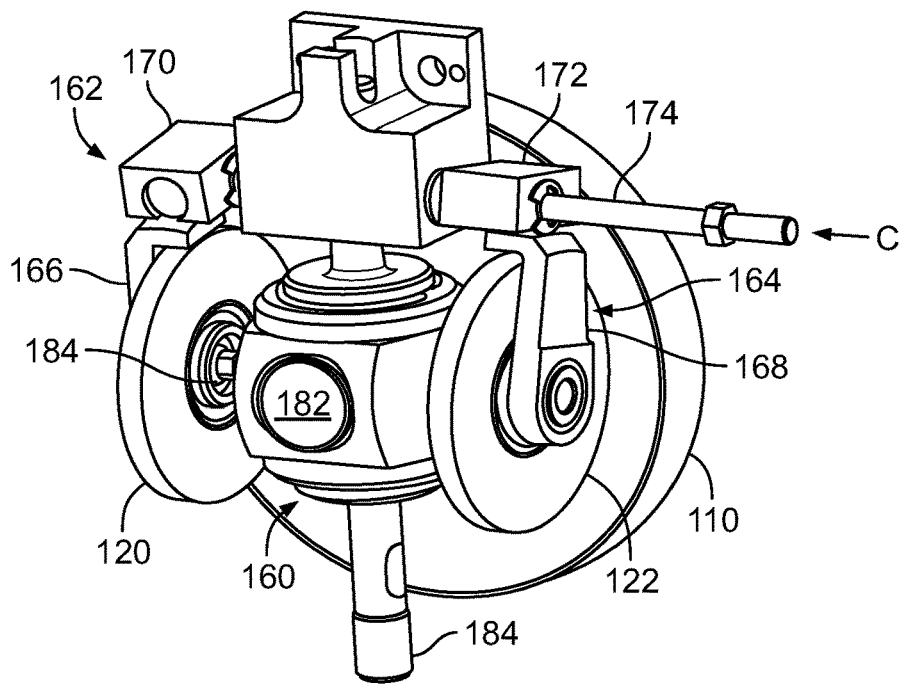

FIGS. 5 and 6 illustrate part of a variator that includes a reaction member 160 operatively coupled to the rollers 120, 122 that transmit drive between the input race 110 and the output race (not shown). The purpose of the reaction member is to bear reaction torque from the rollers 120, 122. The rollers 120, 122 are mounted on carriage assemblies 162, 164. Each carriage assembly comprises a carrier 166, 168 and a mounting part 170, 172. Each roller 120, 122 is carried for rotation about its axis on a respective carrier 166, 168. Each carrier 166, 168 is pivotally connected to the respective mounting part 170, 172.

Each mounting part 170, 172 is carried on an elongate control member 174, such that it is prevented from lineal movement along the control member 174. The control member 174 may move in a linear, reciprocal manner in direction C, causing the mounting parts 170, 172 also to move in direction C. (In this embodiment, the control member does not comprise a movable and a fixed part with the slot arrangement shown in FIGS. 1 to 4.) Each carriage assembly is located within the toroidal cavity by the connection between the mounting parts 170, 172 and the control member 174, and by reaction point at the centre of the roller 120, 122 by its contact with the reaction member 160. In this embodiment reaction torque is borne by the reaction member 160 and not by the control member 174.

The reaction member 160 comprises a body 180 having an aperture 182 through which a variator input shaft and/or output shaft may pass with clearance. Reaction shafts 184, 190 project coaxially and in opposite directions from the body 180 and are aligned normal to the variator axis within the centre plane of the variator. End portions of each reaction shaft 184, 190 are retained in apertures formed, respectively, in a casing 100 of the variator and a mounting block 194 secured to the casing 100 The reaction member 160 is operatively linked to the centre of each roller 120, 122 by a spherical joint 186, 188 so as to transmit the reaction torque from the rollers 120, 122 to the reaction member 160 and to allow for relative pivotal movement between the rollers 120, 122 and the reaction member 160. The reaction member 160 is mounted for rotation about the variator axis in response to reaction torque arising from the disc/roller contact during rotation of the discs thereby changing the variator ratio.

The control member 174 passes through the reaction member 160 at an aperture 192 but is not linked to it. There is suitably sufficient clearance between the control member 174 and the aperture 192 to avoid fouling as reaction torque is borne and the reaction member rotates about the variator axis.

The reaction member 160 is movable radially of the variator axis and may be moved in a non-radial direction such that that the reaction member 160 balances reaction loads generated by each roller 120, 122 within the toroidal cavity.

The reaction member 160 may include a damper to dampen movement of the body 180 for example in a radial direction relative to the variator axis. A mechanical end stop may be provided to limit movement of the reaction member 160 in a radial direction relative to the variator axis.

Figure 7:
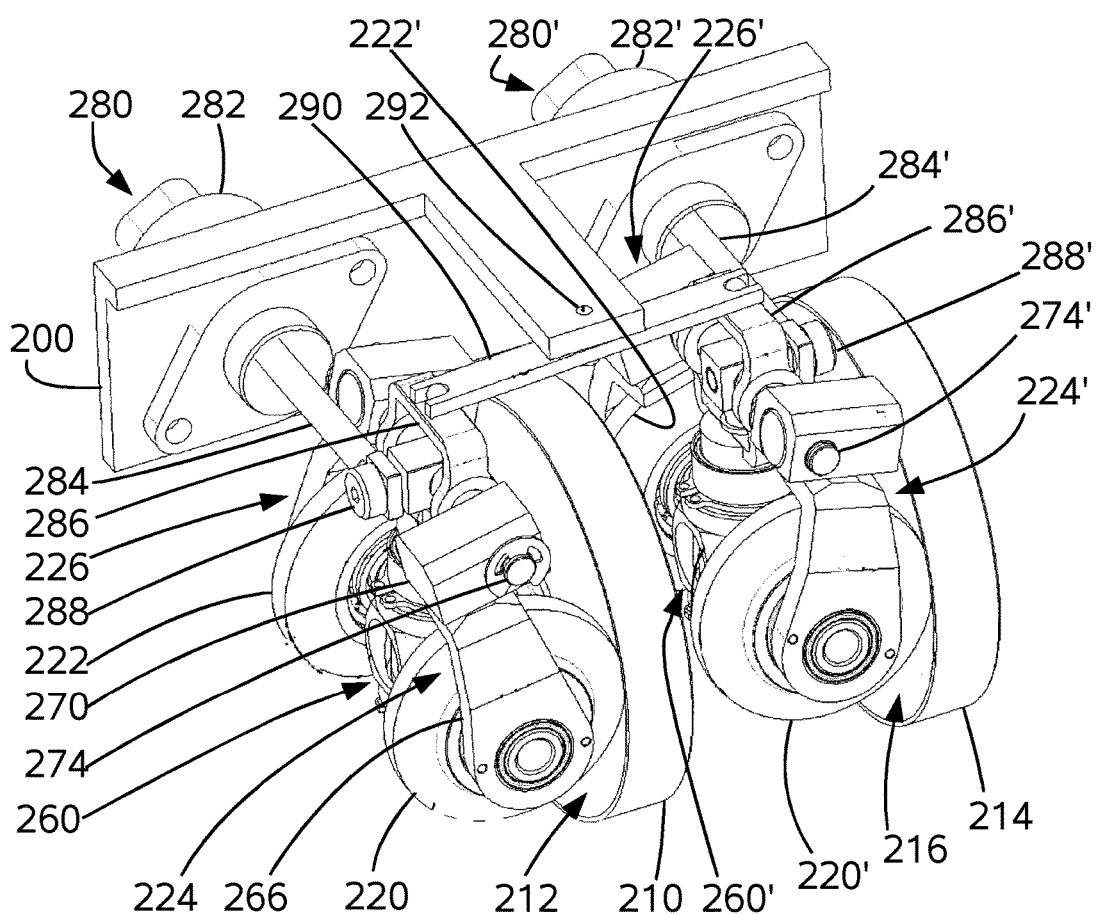
FIG. 7 is a perspective view of part of a variator being a third embodiment of invention having twin cavities with a load sharing assembly for balancing reaction torque between the cavities.

FIG. 7 shows a part of a twin-cavity variator embodying the invention. The variator comprises an input race 210 and similar first and second output races 214 (only one is shown) disposed, in the direction of the variator axis, to opposite sides of the input race 210. Each output race 214 has a working surface 216 that faces the input race 210. The input race 210 has first and second working surfaces 212, that face, respectively, the first and second output races 214. Therefore, two toroidal cavities are defined, a first between the input race 210 and the first output race 214, and a second between the input race 210 and the second output race.

A first set of rollers 220, 222 is provided within the first toroidal cavity to transmit drive between the input race 210 and the first output race, and a second set of rollers 220', 222' is provided within the second toroidal cavity to transmit drive between the input race 210 and the second output race 214. Each roller 220, 222; 220', 222' is mounted on a respective carriage assembly 224, 226; 224' 226'. Each carriage assembly comprises a carrier 266 and a mounting part 270. The roller 220 is mounted for rotation on the carrier 266. The carrier is connected to the mounting part 270 such that it is free to undergo a tilting motion to change the tilt angle of the rollers 220, 222; 220', 222' and thereby change the variator ratio. The respective carriage assemblies 224, 226; 224' 226' are mounted for pivotal movement about an axis that passes through the centre of the respective roller.

A respective hydraulic actuator 280, 280' is associated with each cavity. Each actuator 280, 280' comprises a cylinder 282, 282' that is fixed to a casing 200 of the variator, and an actuator rod 284, 284' that can be driven linearly into or out of the cylinder by suitable application of hydraulic fluid to the cylinder 282, 282'.

Within each cavity, the mounting parts 270 of the two carriage assemblies are 224, 226; 224' 226' are connected to a common control rod 274, 274', such that they are fixed to the control rod against linear movement, but can pivot with respect to it. Each control rod 274, 274' is connected to a respective actuator rod 284, 284' through joint 288, 288' that admits pivotal movement between the control rod and the actuator rod. Thus, operation of the actuators 284, 284' causes linear movement of the control rods 274, 274', and therefore linear movement of the carriage assemblies 224, 226; 224' 226'.

Each cavity has a reaction member 260, 260' to which the rollers 220, 222; 220', 222' are operatively coupled by spherical joints such that the reaction members bear reaction loads arising from the respective rollers, substantially similar to the arrangement of the preceding embodiment. As in the preceding embodiment, each reaction member 260, 260' has reaction shafts, an end portion of one of which is retained within an aperture of the casing 200 of the variator. The other reaction shaft is secured by a yoke 286, 286' that has apertures through which the control rods 274, 274' pass.

The reaction members 260, 260' are operatively linked by a load-sharing assembly. The load-sharing assembly comprises a bar 290 mounted to the casing 286 by a pivot 292. The bar 290 is pivotally connected to the yokes 286, 286' symmetrically about the pivot 292. Therefore, an equal and opposite force is applied to each reaction member through its yoke, which ensures that an equal reaction torque is applied to the rollers 220, 222; 220', 222' in the two toroidal cavities.

Figure 8:
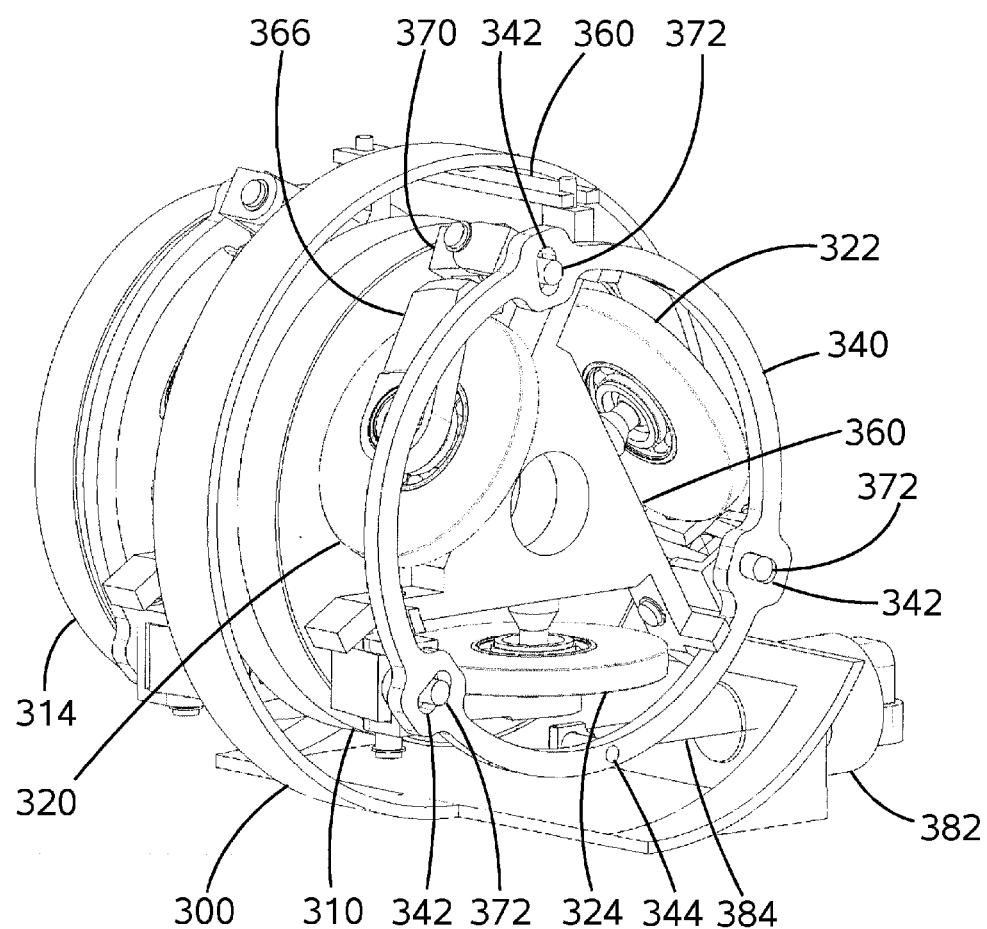
FIG. 8 is a perspective view of a variator being a fourth embodiment of the invention having twin cavities with three rollers per cavity and a load sharing assembly for balancing reaction torque between the cavities.
Figure 9:
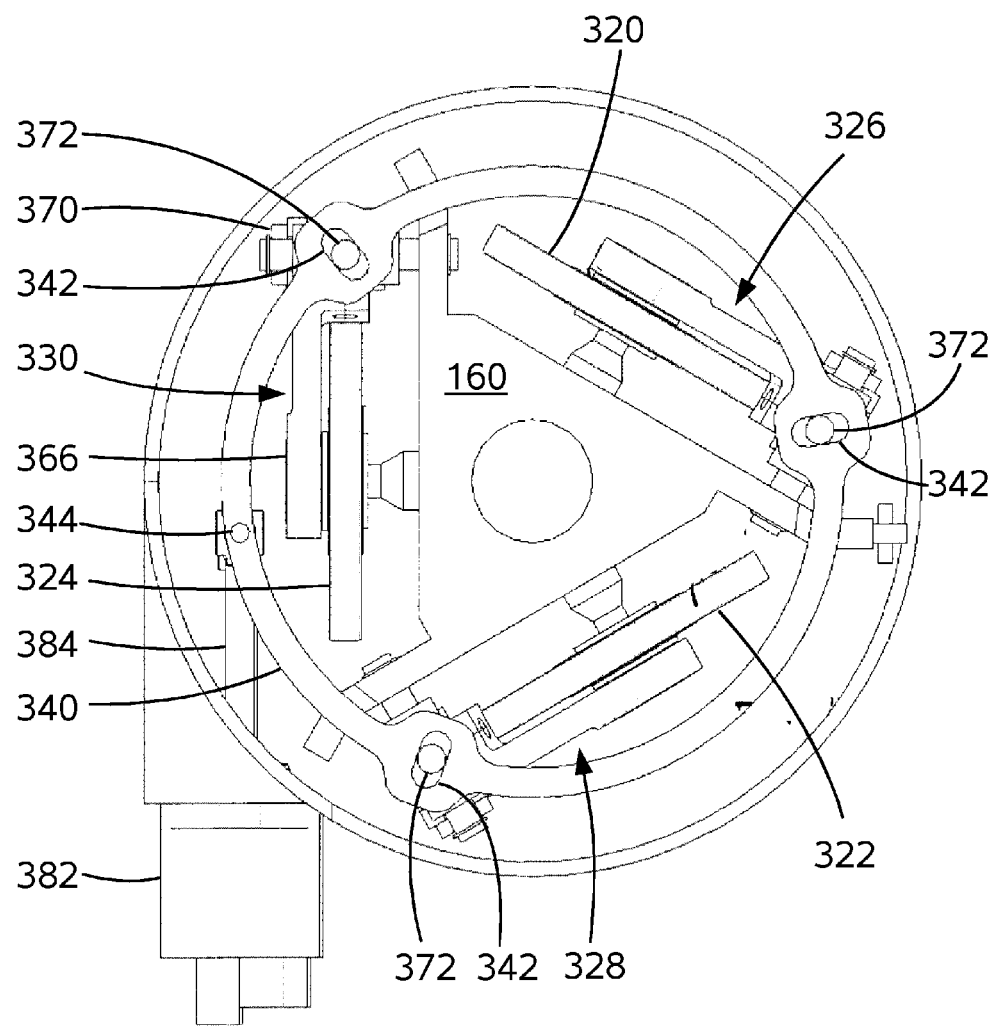
FIGS. 9 and 10 are an axial view and a top elevation of the variator of FIG. 8.
Figure 10:
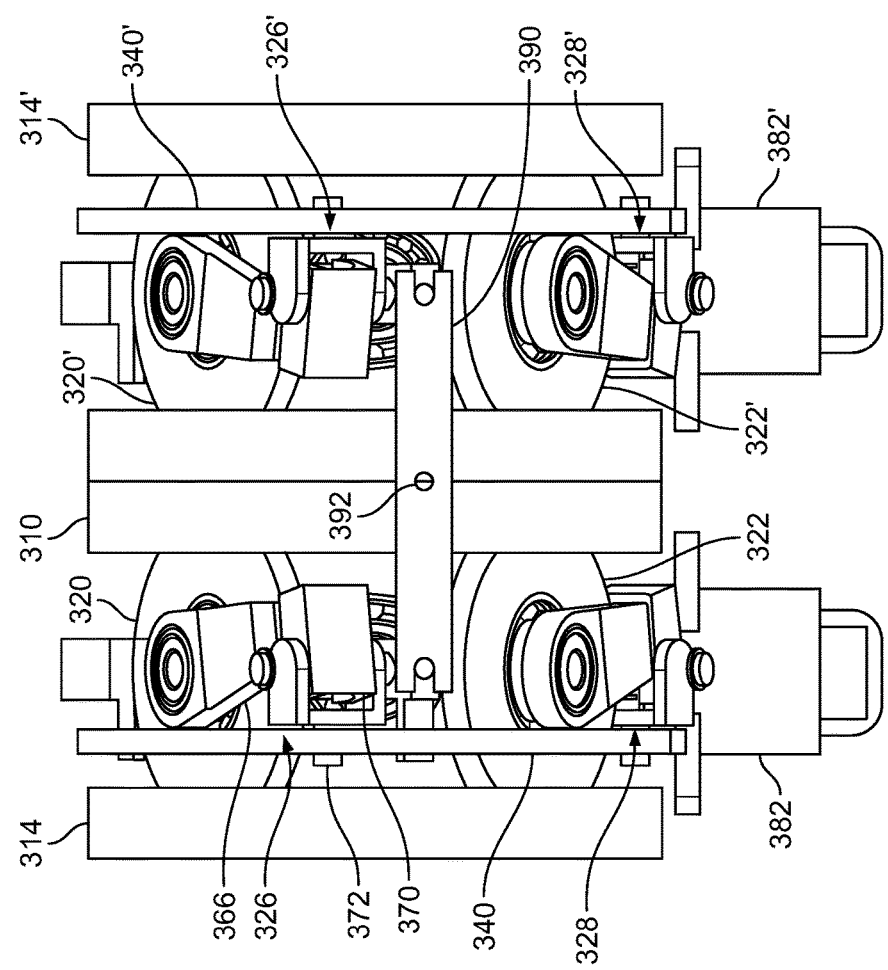

FIGS. 8 to 10 illustrate another embodiment of the invention. The variator comprises an input race 310 and similar first and second output races 314 (only one is shown) disposed, in the direction of the variator axis, to opposite sides of the input race 310. Within each of the two toroidal cavities defined by the races, there are three rollers 320, 322, 324; 320', 322' (one of which is not shown in the drawings).

The variator comprises a reaction member 360, 360' in each cavity. The reaction members 360, 360' are coupled to one another by a load balancing assembly that includes a bar 390 pivotally mounted on a casing 300 of the variator, each reaction member 360 being pivotally connected to the bar 390 symmetrically about its pivot 392.

Each roller 320, 322, 324; 320', 322 is carried for rotation by a respective carriage assembly 326, 328, 330; 326' 328' (one of which is not shown in the drawings). Each roller carriage assembly 320, 322, 324; 320', 322 comprises a carrier 366 and a mounting part 370. The roller 320 is mounted for rotation on the carrier 366. The carrier 366 is connected to the mounting part 370 such that it is free to undergo a tilting motion to change the tilt angle of the rollers 320, 322, 324; 320', 322 and thereby change the variator ratio. A control peg 372 projects from each mounting part.

An annular control member 340, 340' is provided in each cavity. Each control member 340, 340' has three radial slots 342 into each of which one of the control pegs 372 is received. The variator further includes a hydraulic actuator associated with each cavity. Each actuator comprises a cylinder 382, 382' that is fixed to a casing 300 of the variator, and an actuator rod 384 (only one of which can be seen in the drawings) that can be driven linearly into or out of the cylinder by suitable application of hydraulic fluid to the cylinder 382. Each actuator rod 384 is connected to a respective control member 340, 340' by a pivot 344, 344'. By this arrangement, operation of the hydraulic actuator causes the control members 340, 340' to rotate, which, in turn, causes movement of the control pegs 370, and thus rotation of the carriers 366 on their respective mounting parts 370.

Figure 11:
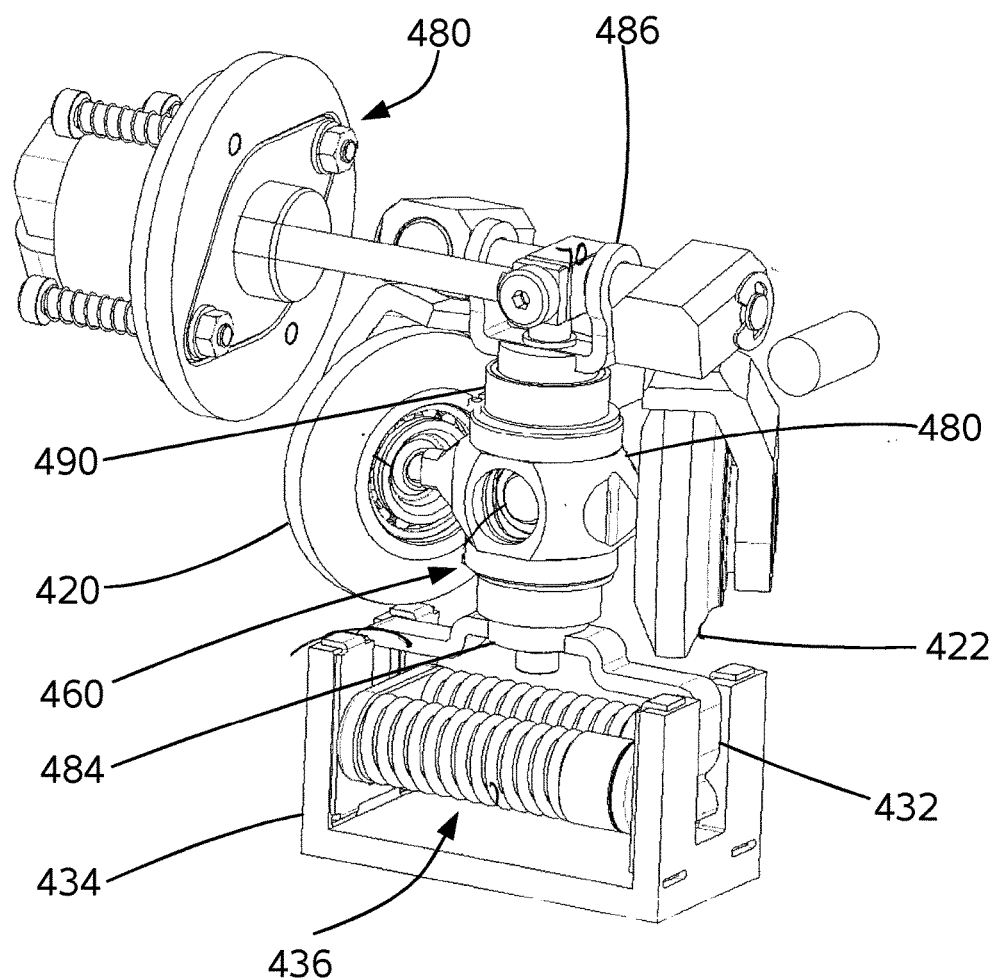
FIG. 11 is a perspective view of part of a variator being a fifth embodiment of the invention including a reaction member and a torque sensing element.
Figure 12:
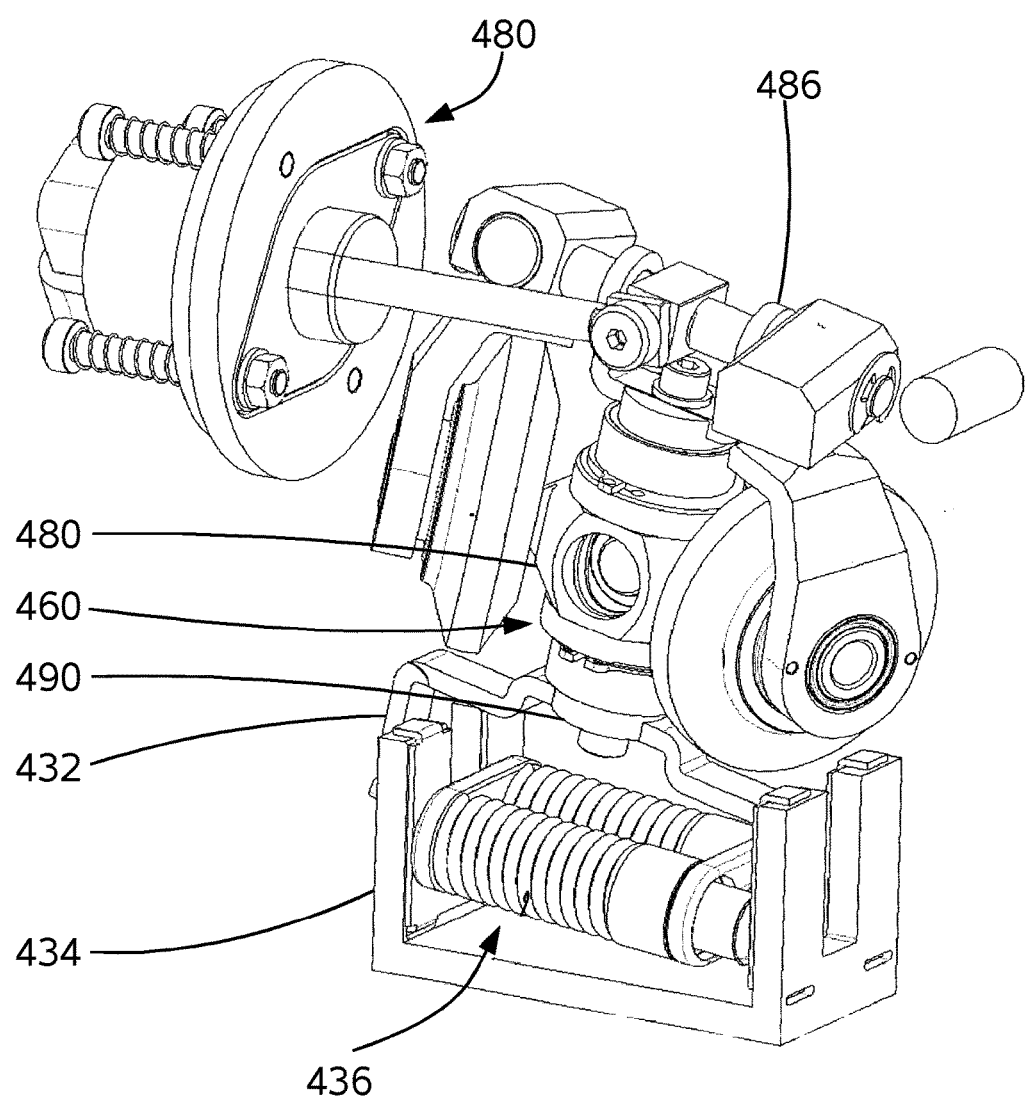
FIG. 12 is a perspective view of the part of a variator shown in FIG. 11 wherein torque is being reacted.

In FIGS. 11 and 12 the reaction member 460 is mounted for rotation about the variator axis in response to a reaction torque above a pre-determined level. The reaction member 460 comprises a body 480 having an aperture 482 through which a variator input shaft and/or output shaft may pass with clearance. Reaction shafts 484, 490 project coaxially and in opposite directions from the body 480 and are aligned normal to the variator axis within the centre plane of the variator. As in the second embodiment, one of the reaction shafts 490 is connected to an actuator 480 through a yoke 486. The other reaction shaft 490 is linked to a resilient mounting assembly 430.

In this embodiment, the resilient mounting assembly 430 includes a support bar 432 to which the reaction shaft 490 is connected and a cradle 434 that is connected to a casing of the variator. The support bar 432 is retained in the cradle by compressed springs 436 against which the reaction shaft 490 applies a torque reaction force. The reaction torque creates a couple on the support bar 432 and its rotation displaces transmission the reaction shaft 490. The springs 436 may be set to deflect when the force applied exceeds a certain threshold. The force imparted may be detected and employed to provide an input signal to the control member 70, for example such that the control member acts to reduce the reaction torque detected, thereby operating to reduce the torque passing through the variator.

It will be seen that in each of these embodiments, actuation of the variator to cause the rolling elements to pitch takes place substantially or entirely radially outwardly of the rolling elements. Thus, components that are responsible for performing actuation have minimal or no intrusion into the space between the rolling elements. In each of these embodiments, actuation of the variator to causes the rolling elements to pitch takes place in a space that does not extend beyond the races in a direction parallel to the variator axis. In many cases, when the variator is used as part of a larger transmission system, there is little or no available space beyond the races in the direction of the variator axis within which components can be packaged. In addition, in each embodiment, the axis about which the pitching rotation occurs is not coincident with a physical component such as a shaft and an axis—instead, it is defined by the constraints imposed upon the motion of the carriers by components (such as the actuation point and the reaction point) that are remote from the tilt axis.

What is claimed is:

1. A variator comprising:
an input working surface and an output working surface, the input and output working surfaces being coaxially mounted for rotation about a variator axis;
a toroidal cavity being defined between the working surfaces; and
two and only two rolling elements disposed between and arranged be in driving engagement with the input and the output working surfaces at respective contact regions, each of the rolling elements being mounted on a carriage assembly for rotation about a rolling axis, each of the rolling elements being free to pivot about a tilt axis, the tilt axis passing through the respective rolling element perpendicular to the rolling axis; and intersecting the rolling axis at a rolling element centre,
wherein a change in a variator ratio being, which is defined as a ratio of rotational speeds of the input and the output working surfaces, occurs with a change in tilt angle about the tilt axis for each rolling element;
wherein each carriage assembly is mounted for a further pivotal movement of its associated rolling element that results in a change of a pitch angle of the rolling element about a pitch axis, the pitch axis passing through the rolling element centre and through its contact regions;
wherein the variator comprises a control member operative to provide actuation to each of the carriage assemblies at an actuation point by translational movement that causes the associated rolling element to pivot about its pitch axis thereby changing the pitch angle, so urging the rolling elements to pivot about their tilt axes and thereby provide a change in the variator ratio; and
wherein the control member is operatively coupled to the two rolling elements on the same side of a plane that includes and extends along the variator axis.

2. The variator according to claim 1, wherein each carriage assembly is actuated at an actuation point radially distant from the pitch axis such that the carriage assembly undergoes pivotal movement about the pitch axis.

3. The variator according to claim 1, wherein each actuation point is offset from a centre plane of the toroidal cavity in a direction parallel to the variator axis.

4. The variator according to claim 1, wherein a castor axis for each rolling element extends through the corresponding rolling element centre and its actuation point.

5. The variator according to claim 1, wherein each rolling element and its respective carriage assembly together have four points of contact, the four points of contact being at the input working surface, the output working surface, an actuation point and a reaction point.

6. The variator according to claim 1, wherein the control member is adapted to provide actuation by translational movement.

7. The variator according to claim 1, wherein the control member actuates the carriage assembly at a location radially outward of a cylindrical surface that has an axis substantially coincident with the variator axis and tangential to a periphery of the larger of the input surface and output surface.

8. The variator according to claim 1, wherein the carriage assemblies are actuated simultaneously.

9. The variator according to claim 1, wherein the variator comprises a single control member on which the carriage assemblies are mounted.

10. The variator according to claim 1, wherein each carriage assembly comprises a stem coupled to the control member.

11. The variator according to claim 1, wherein the variator comprises a reaction member operatively coupled to the rolling elements such that the reaction member bears a reaction torque from the rolling elements within the toroidal cavity.

12. The variator according to claim 11, wherein the reaction torque is borne by the reaction member separately from the control member.

13. The variator according to claim 11, wherein the reaction member is pivotally coupled to the rolling element centre of each rolling element.

14. The variator according to claim 11, wherein the reaction member is movable radially of the variator axis and optionally is movable in a non-radial direction such that that the reaction member balances reaction loads generated by each rolling element within the toroidal cavity.

15. The variator according to claim 11, wherein the variator comprises a damper to dampen movement of the reaction member.

16. The variator according to claim 11, wherein the reaction member comprises a mechanical end-stop to limit movement of the reaction member in a radial direction relative to the variator axis.

17. The variator according to claim 11, wherein the reaction member is mounted for rotation about the variator axis in response to the reaction torque.

18. The variator according to claim 11, wherein the variator comprises resilient means against which the reaction member may be urged in response to the reaction torque.

19. The variator according to claim 1, wherein the variator comprises power means to actuate the control member having a power output of less than 20 W.

20. The variator according to claim 1, wherein movement of each carriage assembly about the pitch axis is achieved by a single translational input substantially perpendicular to a carriage reaction force.

21. The variator according to claim 1, wherein movement of each carriage assembly about the pitch axis is achieved by means of a single actuator for all roller carriages of the variator.

22. The variator according to claim 1, wherein the variator is a full-toroidal variator.

23. A variator according to claim 1 further comprising:
a second input surface and a second output surface that faces the second input surface to define a second toroidal cavity;
a second plurality of rolling elements disposed between the second input and second output surfaces and being in driving engagement with the second input and the second output surfaces at respective contact regions, each rolling element being mounted on a carriage assembly for rotation about a rolling axis, each rolling element being free to pivot about a tilt axis, the tilt axis passing through the rolling element perpendicular to the rolling axis, and intersecting the rolling axis at a roller centre, whereby a change in the variator ratio being the ratio of rotational speeds of the races occurs with a change in tilt angle;
wherein each carriage assembly is mounted for pivotal movement about a pitch axis that results in a change of a pitch angle of the rolling element, the pitch axis passing through the roller centre and through the contact regions;
the control member or a second control member for actuation of the each second carriage assembly to pitch the second plurality of rolling elements resulting in a change in pitch angle and a change in the variator ratio.

24. A variator according to claim 23 further comprising:
a first reaction member operatively coupled to the plurality of rolling elements in the first cavity and a second reaction member operatively coupled to the second plurality of rolling elements in the second cavity such that the first and second reaction members bear reaction loads arising from the respective rolling elements; and
a load-sharing assembly operatively linked to the reaction members of the first and second cavities such that reaction torque from the reaction members is balanced.

25. A drive arrangement for transmitting drive from an engine to an auxiliary unit, the drive arrangement incorporating a variator according to claim 1.

26. A drive arrangement according to claim 25 for a supercharging arrangement for an internal combustion engine the supercharging arrangement comprising a supercharger having a rotational drive input a transmission having a rotational drive input to receive drive from an internal combustion engine, and a rotational drive output coupled to the input of the supercharger wherein the transmission includes the variator operatively connected between the input and the output of the transmission.

27. The variator according to claim 1, wherein the carriage assembly comprises a stem which lies in a centre plane of the variator.

28. A variator comprising:
an input working surface and an output working surface, the input and output working surfaces being coaxially mounted for rotation about a variator axis;
a toroidal cavity being defined between the working surfaces;
two and only two rolling elements disposed between and arranged to be in driving engagement with the input and the output working surfaces at respective contact regions,
wherein each rolling element being mounted on a gimbal on a carriage assembly for rotation about a rolling axis, each rolling element being free to pivot about a tilt axis, the tilt axis passing through the rolling element perpendicular to the rolling axis, and intersecting the rolling axis at a rolling element centre, whereby a change in a variator ratio being defined as the ratio of rotational speeds of the input and the output working surfaces occurs with a change in the tilt angle about the tilt axis for each rolling element;
wherein each carriage assembly is mounted for a further pivotal movement of its associated rolling element about a pitch axis that results in a change of a pitch angle of the rolling element about a pitch axis, the pitch axis passing through the rolling element centre and through its contact regions;
wherein the variator further comprising a control member operative to provide actuation to each of the carriage assemblies at an actuation point by translational movement that causes the associated rolling element to pivot about its pitch axis thereby changing the pitch angle, so urging the two rolling elements to pivot about their tilt axes and thereby provide a change in the variator ratio; and
wherein the control member is operatively coupled to the rolling elements on the same side of a plane that includes and extends along the variator axis.

29. A variator according to claim 28, wherein the gimbal provides a castor angle for the roller.

* * * * *